United States Patent
Chitalia et al.

(10) Patent No.: US 7,233,239 B2
(45) Date of Patent: Jun. 19, 2007

(54) METHOD AND APPARATUS FOR DETECTING IMPROPER INSTALLATION OF CHILD SEAT IN A VEHICLE

(75) Inventors: Janak Chitalia, Westland, MI (US); Joseph Brown, Grosse Ile, MI (US); Chris Bujak, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 791 days.

(21) Appl. No.: 10/700,974

(22) Filed: Nov. 4, 2003

(65) Prior Publication Data
US 2005/0092539 A1    May 5, 2005

(51) Int. Cl.
  *G08B 21/00* (2006.01)
  *B60Q 1/00* (2006.01)
  *B60N 2/42* (2006.01)
  *G01L 1/26* (2006.01)

(52) U.S. Cl. .................. 340/457.1; 340/665; 340/666; 340/667; 340/668; 280/735; 180/273; 180/271; 180/268; 701/45; 701/46; 701/47; 701/48; 701/49; 297/250.01; 297/217.1; 73/862.474; 73/862.471; 73/862.393; 73/862.451

(58) Field of Classification Search ............. 340/457.1, 340/665–668; 280/735; 180/273; 701/45–49; 73/862.474, 862.471; 297/250.1
See application file for complete search history.

(56) References Cited

U.S. PATENT DOCUMENTS

| | | |
|---|---|---|
| 4,345,791 A | 8/1982 | Bryans et al. |
| 5,474,327 A | 12/1995 | Schousek |
| 5,711,574 A | 1/1998 | Barnes |

(Continued)

FOREIGN PATENT DOCUMENTS

WO    WO 02/26531    4/2002

*Primary Examiner*—Daniel Wu
*Assistant Examiner*—Lam Pham
(74) *Attorney, Agent, or Firm*—Gary A. Smith

(57) ABSTRACT

A method and apparatus for detecting an improperly installed auxiliary child seat of the type that is secured in a motor vehicle by the seatbelt, and providing an alert to a vehicle operator in the case of improper installation. A seat occupancy sensor, a seatbelt buckle condition sensor, and a seatbelt tension sensor provides electrical signals to a child seat detection module, which determines that an improper installation condition exists if the auxiliary child seat is present and the seatbelt buckle is unfastened. The child seat detection module further determines an improper installation condition if the auxiliary child seat is present, the seatbelt buckle is fastened, and the seatbelt tautness is not within an acceptable range. If an improper installation condition is detected, the child seat detection module triggers an alerting device, such as a warning light on the instrument panel or audible chime. The seat occupancy sensor may a bladder-type weight sensor, or a pressure pattern sensor that is able to detect a child seat based on the weight distribution over the area of the seat. The child seat detection module includes a memory unit containing information for all auxiliary child seats that are compatible with the vehicle. A user interface allows the vehicle operator to input the type of seat installed in the vehicle, the weight of the child to be carried, and other pertinent information if necessary, and the child seat detection module calculates the range of acceptable tension values or looks up the correct values in a saved table.

18 Claims, 3 Drawing Sheets

U.S. PATENT DOCUMENTS

| | | |
|---|---|---|
| 5,720,519 A | 2/1998 | Barnes |
| 5,804,887 A | 9/1998 | Holzapfel et al. |
| 5,851,026 A | 12/1998 | Schoos et al. |
| 6,450,576 B1 * | 9/2002 | Rhein et al. ............. 297/250.1 |
| 6,623,032 B2 * | 9/2003 | Curtis et al. ................ 280/735 |
| 6,854,415 B2 * | 2/2005 | Barnes et al. ............. 116/67 R |
| 6,868,745 B2 * | 3/2005 | Sullivan et al. ........ 73/862.391 |
| 2005/0040960 A1 * | 2/2005 | Knox ......................... 340/668 |

\* cited by examiner

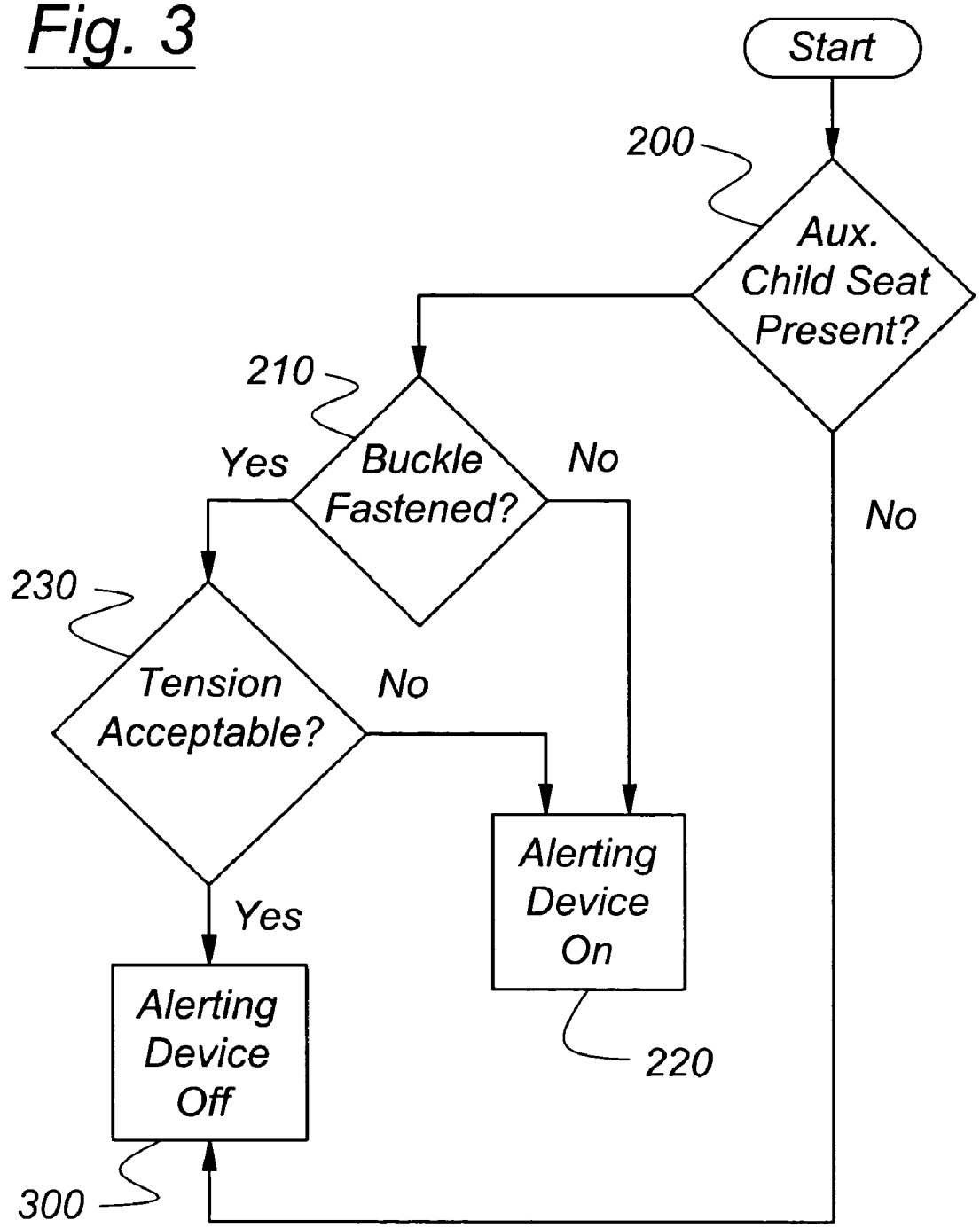

METHOD AND APPARATUS FOR DETECTING IMPROPER INSTALLATION OF CHILD SEAT IN A VEHICLE

FIELD OF THE INVENTION

The invention relates to auxiliary child seats used in motor vehicles to restrain infants and small children, and more particularly to a system installed in a motor vehicle to alert the vehicle operator if such an auxiliary child seat is not properly secured inside the vehicle so that the operator may correct the situation before driving the vehicle.

BACKGROUND OF THE INVENTION

When infants and small children ride in a motor vehicle, it is recommended for safety reasons that they be restrained in an auxiliary child seat. Many types of auxiliary child seats are commercially available for infants/children of varying sizes and weights. Many of these auxiliary child seats are secured in place on a vehicle seat by the occupant restraint seatbelt that is primarily intended for restraining a full size occupant in the seat.

Surveys have shown that many vehicle operators do not properly install their auxiliary child seat in their vehicles, and consequently the effectiveness of the seat in protecting the infant or child may be reduced.

It would be desirable to provide a system by which a vehicle operator could be alerted to the fact that an auxiliary child seat installed in his/her vehicle is not properly installed, so that the operator can correct the potentially dangerous condition before driving the vehicle.

In the pursuit of greater safety for occupants of vehicles during a crash, many automotive vehicles are now or will soon be equipped with a seat occupant classification system for one or more of the passenger seats. An occupant classification system senses the size, weight, and/or position of a person or object present in the seat and provides this information to a restraints control module that uses the information to determine whether and to what degree to activate restraint systems during a crash or other high acceleration/deceleration event. Occupant classification systems use various types of sensors, including fluid-filled, pressure-sensing bladders and load-responsive electrical switches installed within the seat.

It is common for vehicles to be equipped with seatbelt buckle condition sensors that determine whether the buckle or latch of a seatbelt is in a fastened or unfastened condition. This information has been used for various purposes, including alerting the vehicle operator if one or more seat occupants have not fastened their seatbelts. U.S. Pat. No. 6,250,672 teaches an airbag restraint system in which the airbag is deactivated if an occupant classification sensor determine that a small-statured person or a child carrier seat is present in the passenger seat of a vehicle. A seatbelt buckle condition sensor is used to activate an airbag condition indicator light is illuminated if the seatbelt buckle is fastened, which will be the case only if a child carrier seat is present, thereby giving the vehicle operator a positive indication that the airbag is deactivated.

It is also known to provide a seatbelt tension sensor to detect the amount of tension present in a seatbelt when it is fastened around a seat occupant. The amount of tension in the belt may be used to derive a more accurate reading of seat occupant weight, since a taut belt may exert a downward force on the occupant that is detected by a seat weight sensor. The downward force contributed by the belt tension is subtracted from the total weight reading to get an actual seat occupant weight. A system that operates in this manner is disclosed in U.S. Patent Application Publication 2002/0043789A1.

A seatbelt tension monitoring system and associated occupant classification system is disclosed in U.S. patent application Ser. No. 10/177,442 titled "Method of Controlling Airbag Deployment," filed by the applicant of the present application on 21 Jun. 2002, the disclosure of which is incorporated herein by reference.

SUMMARY OF THE INVENTION

The present invention provides a method and apparatus for detecting an improperly installed auxiliary child seat of the type that is secured in a motor vehicle by the seatbelt, and providing an alert to a vehicle operator in the case of improper installation. According to the invention, a seat occupancy sensor provides a first electrical signal indicating whether the auxiliary child seat is present on a vehicle seat, a buckle condition sensor provides a second electrical signal indicating whether the seatbelt buckle associated with the seat is fastened or unfastened, and a seatbelt tension sensor provides a third electrical signal indicating a tautness of the seatbelt. The electrical signals from the three sensors are received by a child seat detection module, which determines in a first logic step that an improper installation condition exists if the auxiliary child seat is present and the seatbelt buckle is unfastened. The child seat detection module further determines in a second logic step that an improper installation condition exists if the auxiliary child seat is present, the seatbelt buckle is fastened, and the seatbelt tautness is not within an acceptable range. If an improper installation condition is detected, the child seat detection module triggers an alerting device, such as a warning light on the instrument panel or audible chime.

The seat occupancy sensor may a bladder-type weight sensor, or a pressure pattern sensor that is able to detect a child seat based on the weight distribution over the area of the seat.

According to another feature of the invention, a user interface allows the vehicle operator to input the values of acceptable belt tension into the child seat detection module, since this may vary depending on the seat, the weight of the child to be carried in it, and other factors. Alternatively, the child seat detection module includes a memory unit containing information for all auxiliary child seats that are compatible with the vehicle. The vehicle operator inputs the type of seat installed in the vehicle, the weight of the child to be carried, and other pertinent information if necessary, and the child seat detection module calculates the range of acceptable tension values or looks up the correct values in a saved table. The user interface may be a dedicated unit such as a touch pad and associated display, or a multifunction display on the vehicle instrument panel or console and with which the vehicle operator communicates with other vehicle systems.

BRIEF DESCRIPTION OF THE DRAWINGS

FIG. 3 is a flow diagram showing a logic flow according to the invention.

DETAILED DESCRIPTION OF A PREFERRED EMBODIMENT

Figure 1:
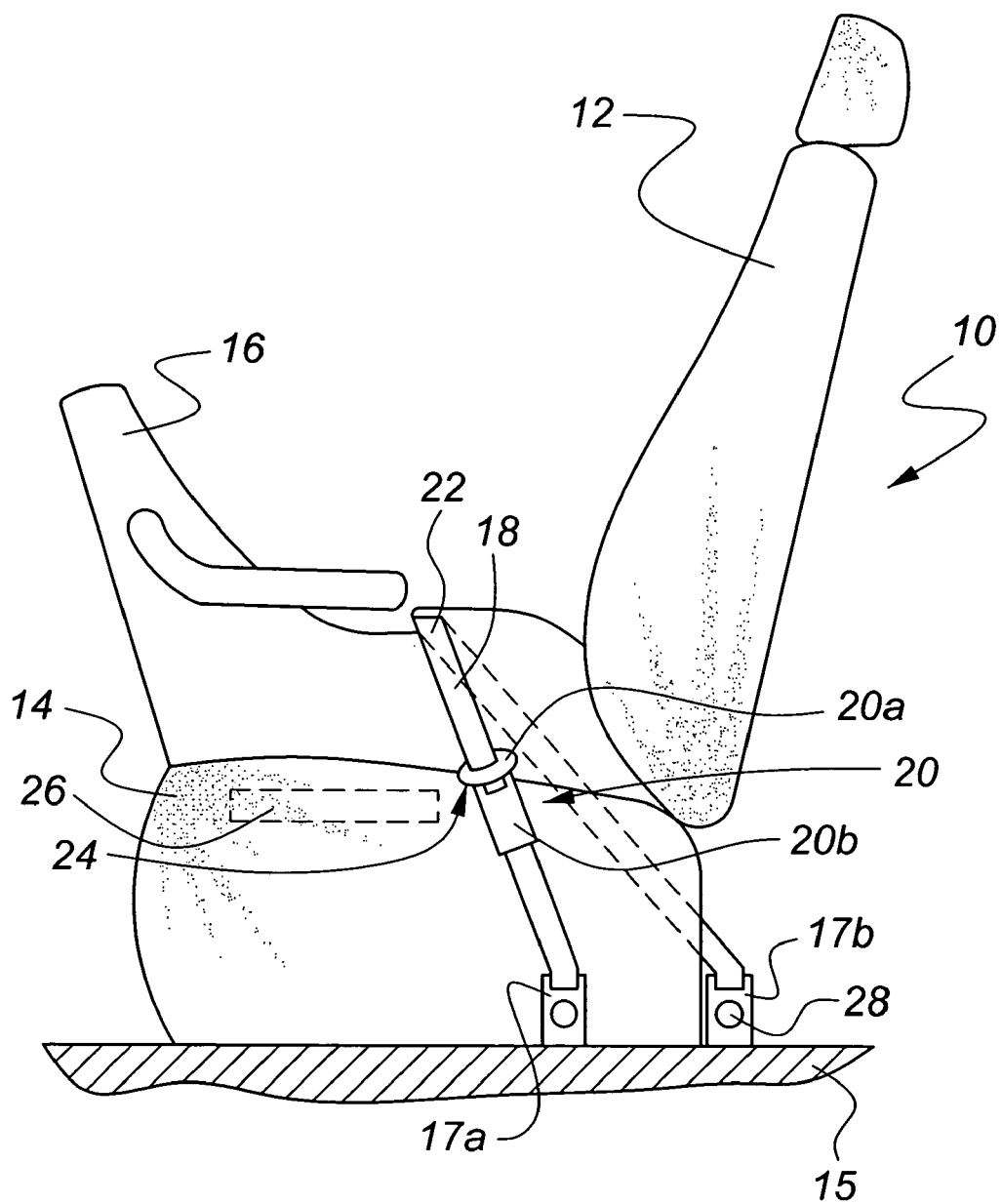
FIG. 1 is a schematic view showing a motor vehicle seat with an auxiliary child seat positioned thereon and a system according to the present invention.

A motor vehicle includes a seat assembly, generally indicated at 10 in FIG. 1, comprising a seat back 12 and a seat cushion 14. An auxiliary child seat 16 is shown positioned on the seat cushion 14 and secured in place by a seatbelt 18 associated with the seat assembly 10. Seatbelt 18 is secured at its ends to the seat 10 and/or other parts of the vehicle structure (such as the floor 15) at anchors 17a,17b. Seatbelt 18 is also used to restrain an occupant (not shown) in the seat 10 in a conventionally known manner when the auxiliary child seat 16 is not present in the seat. The seatbelt 18 has a buckle assembly 20 of the type well known in the art for securing the seatbelt 18 around the occupant or the auxiliary child seat 16. Buckle assembly 20 may comprise, for example, a latch plate 20a secured to an end of the seatbelt 18 and which is matingly engageable with a buckle 20b secured to another end of the belt and/or extending from anchor 17a.

Auxiliary child seat 16 may be any of the many commercially available seats used to restrain infants or small children and is designed to be secured to the vehicle seat 10 by means of the vehicle's seatbelt 18. In the example illustrated, the seatbelt 18 is passed over the auxiliary child seat 16, engages a slot 22 formed in the auxiliary child seat, and the buckle assembly 20 is fastened. The seatbelt 18 is then tightened using the buckle assembly 20 and/or other tensioning system, such as a belt retractor (not shown) to pull the auxiliary child seat 16 securely downward and rearward into the seat 10.

Buckle assembly 20 is equipped with a latching condition sensor, indicated generally at 24, that generates an electrical signal indicating whether or not the buckle assembly is properly latched. Latching condition sensor 24 may be a simple electrical switch having contacts on the latch plate 20a and the buckle 20b that complete a circuit only when the two components are engaged with one another. Such buckle condition sensors are well known in the restraints arts and are typically used in systems that remind vehicle occupants to fasten their seatbelts before the vehicle is driven.

The seat assembly 10 is equipped with an occupant classification sensor 26 disposed beneath the upper surface of the seat cushion 14. The occupant classification sensor 26 may be any appropriate device capable of detecting or measuring the magnitude and/or location of weight applied to the seat cushion 14. One example of such an occupant classification sensor 26 is a fluid-filled bladder with a sensor that monitors the internal pressure of the bladder, an increase in pressure indicating greater weight on the seat cushion 14. Another example is a pressure pad consisting of an array of sensor pads distributed over the area of the seat cushion 14, the electrical resistance of each sensor pad varying with the amount of weight applied. Such a pressure pad is able to determine not only total weight on the seat cushion 14, but also a "pressure pattern" of the weight distribution over the area of the pad. It is known to use this pressure pattern to determine whether an auxiliary child seat (as opposed to some other inanimate object or a living occupant) is on the seat cushion 14. See, for example, U.S. Pat. No. 5,474,327 (the disclosure of which is incorporated herein by reference).

Other types of occupant classification sensors detect the presence and/or size and/or configuration of a person or object located in the seat by non-contact sensing. Among these non-contact systems are ultrasonic, infrared, vision, and capacitive sensing systems, all of which are well known in the art.

The seatbelt 18 is provided with a seatbelt tension sensor 28. Seatbelt tension sensor 28 may comprise, for example, one or more strain gages integrated with one or more of the belt anchors 17a,17b. A seatbelt tension sensor 28 may also be located at some other point along the length of the seatbelt 18, as is well known in the vehicle restraints art.

The overall system architecture will now be described with reference to FIG. 2. The occupant classification sensor 26 and seatbelt tension sensor 28 generate respective electrical output signals that are fed to a restraints control module (RCM 30) 30. RCM 30 is used to monitor and control activation and/or suppression of occupant restraint systems such as an airbag 32 and a seatbelt pretensioner 34, as is well known in the art. RCM 30 typically receives signals from one or more crash sensors 31 located at various places on the vehicle. The occupant classification sensor 26 and seatbelt tension sensor 28 signals may be used by the RCM 30 to calculate the weight and/or seating position of an occupant of the seat so that the RCM 30 can activate or suppress the restraint systems in a manner calculated to provide optimum crash protection, as disclosed in U.S. patent application Ser. No. 10/177,442 (the disclosure of which is incorporated herein by reference). For example, if the occupant classification sensor 26 indicates that an auxiliary child seat 16 is present in a seat that is equipped with a front airbag, inflation of the airbag may be suppressed in a collision.

A child seat detection module (CDSM) 36 receives output signals from the occupant classification sensor 26, seatbelt tension sensor 28, and buckle condition sensor 24. CDSM 36 is preferably a microprocessor-based device, but may be any appropriate type of electrical circuit capable of receiving and interpreting the signals and performing the system functionality described below. CDSM 36 is preferably integrated with the RCM 30 as shown in FIG. 2, since both modules use the signals from the occupant classification sensor 26, seatbelt tension sensor 28, and buckle condition sensor 24. CDSM 36 is also connected with an alerting device 38, which generates an audible and/or a visual alert when activated by the CDSM.

FIG. 3 illustrates the logic performed by the CDSM 36. The sequence may be initiated by the activation of one or more vehicle electrical systems, such as when the vehicle ignition (not shown) is switched to ON. In the first step in the sequence, the occupant classification sensor 26 is activated to determine what type of person or object is present on the seat cushion 14, block 200. If occupant classification sensor 26 determines that something other than an auxiliary child seat 16 is present, the system progresses to block 300, and the alerting device 38 is not activated. If an auxiliary child seat 16 is present, the signal from the buckle condition sensor 24 is considered at block 210. If the buckle condition sensor 24 indicates that the seatbelt 18 associated with the seat in question is not fastened, the auxiliary child seat 16 cannot possibly be properly installed, and the alerting device 38 is activated, block 220.

If, at block 210, the buckle condition sensor 24 indicates that the seatbelt 18 is properly fastened, the signal from the seatbelt tension sensor 28 is considered at block 230. If the tension falls within the range of values indicating that the auxiliary child seat 16 is properly installed, the system progresses to block 300, and the alerting device 38 is not activated. If the tension falls outside of the range of acceptable values indicating proper installation of the auxiliary child seat 16, the system progresses to block 220, and the alerting device 38 is activated.

The acceptable tension range consistent with proper installation of the auxiliary child seat 16 will be determined by the manufacturer of the auxiliary child seat 16 and/or governmental agencies responsible for motor vehicle safety. The system preferably includes a user interface 40 (see FIG. 2) that allows the vehicle operator to input the correct values of acceptable belt tension into the CDSM 36, since the acceptable tension range may vary depending on the seat, the weight of the child to be carried in it, and other factors. The user interface 40 may comprise, for example, a touch pad and associated display to show indicate to the user the values that have been entered. The user interface 40 may be a dedicated only to operation of the CDSM 36, or it may be a multifunction display on the vehicle instrument panel or console with which the vehicle operator communicates with additional vehicle systems other than the CDSM.

A data storage unit 42 may also be provided that contains information for all types of auxiliary child seats that are compatible with the vehicle, so that the vehicle operator can input the type of seat, the weight of the child to be carried, and other pertinent information if necessary, and the CDSM 36 can then calculate the range of acceptable tension values or "look up" the correct values in a saved table.

Figure 2:
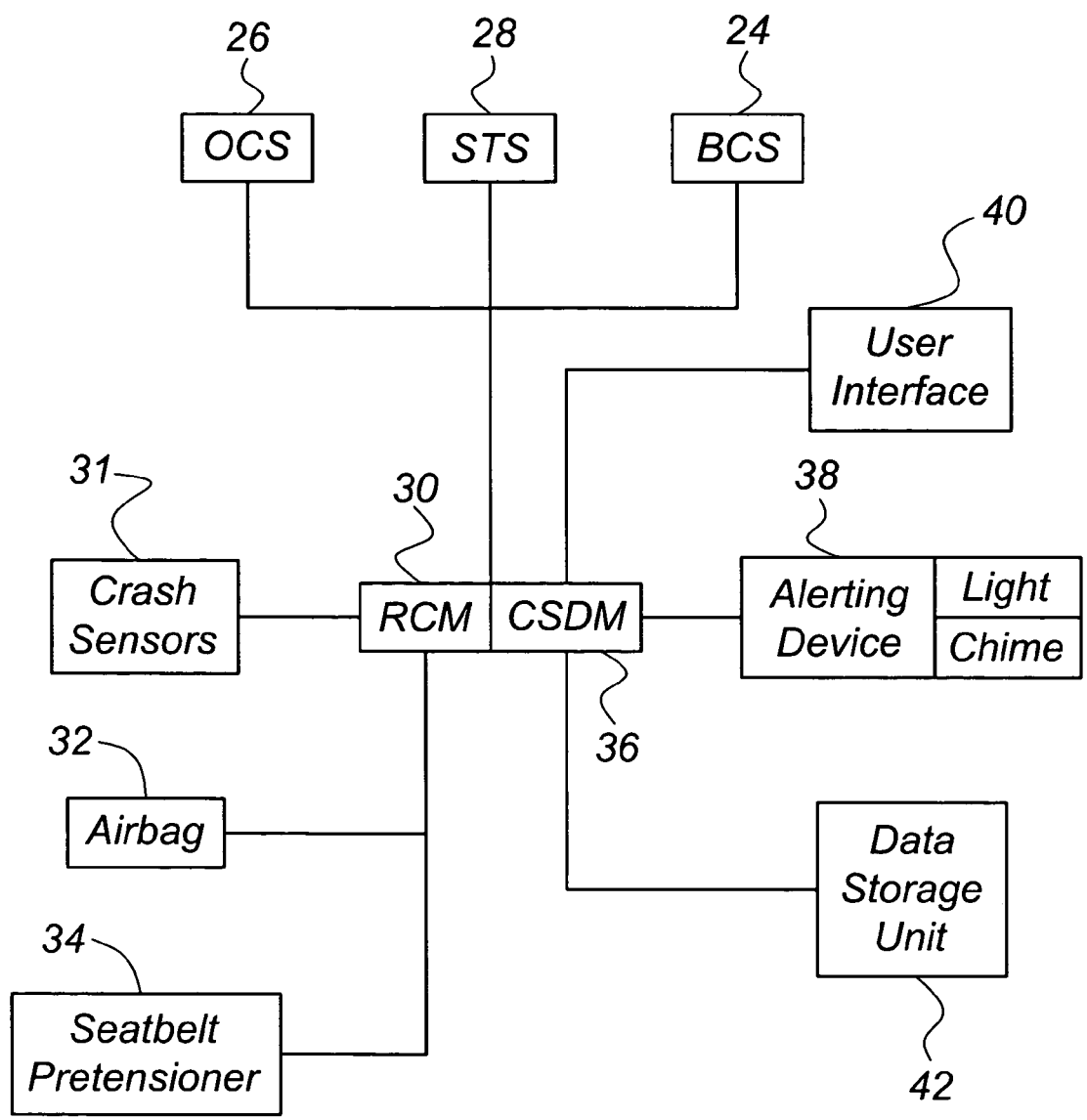
FIG. 2 is a block diagram showing the components of the invention system and related components of an occupant protection system.

Any of the elements shown in FIG. 2 as discrete components may be combined with one another structurally and/or functionally in an appropriate manner to reduce the size, cost, or complexity of the overall system. For example, user interface 40 and data storage unit 42 may be integrated into a single unit if desired. In another possible variation, data storage unit 42 may be integrated with CSDM 36.

The invention claimed is:

1. A method of detecting improper installation of an auxiliary child seat in a motor vehicle and alerting a vehicle operator in the case of improper installation, the auxiliary child seat having a properly installed condition wherein the auxiliary child seat is resting on top of a vehicle seat, a seatbelt anchored to the vehicle is fastened around the auxiliary child seat by means of a seatbelt buckle, and the seatbelt is tightened to a tautness within an acceptable range, the method comprising:
   monitoring a seat occupancy sensor to determine whether the auxiliary child seat is present on the vehicle seat;
   monitoring a buckle condition sensor to determine whether the seatbelt buckle is fastened or unfastened;
   activating an alerting device if the auxiliary child seat is present on the vehicle seat and the seatbelt buckle is unfastened;
   monitoring a seatbelt tension sensor to determine a tautness of the seatbelt; and
   activating the alerting device if the auxiliary child seat is present, the seatbelt buckle is fastened, and the seatbelt tautness is not within the acceptable range.

2. The method of claim 1, wherein the step of monitoring the seat occupancy sensor comprises monitoring a weight sensor to determine if an object having a weight similar to the auxiliary child seat is resting on the seat.

3. The method of claim 1, wherein the step of monitoring the occupant classification sensor comprises monitoring a pressure pattern sensor to determine if an object having a profile similar to the auxiliary child seat is resting on the seat.

4. The method of claim 1, wherein the step of monitoring the occupant classification sensor comprises monitoring pressure within a fluid-filled bladder located within the seat.

5. The method of claim 1, wherein the step of activating an alerting device comprises generating an audible alert.

6. The method of claim 1, wherein the step of activating an alerting device comprises generating a visible alert.

7. The method of claim 1, further comprising the step of entering information into a control module to allow determination of the acceptable range.

8. The method of claim 7, wherein the step of entering information comprises identifying the auxiliary child seat.

9. The method of claim 7, wherein the step of entering information comprises indicating the weight of a child to be secured in the auxiliary child seat.

10. The method of claim 7, wherein the step of entering information comprises storing data related to the auxiliary child seat in a data storage device associated with the control module.

11. An apparatus for detecting improper installation of an auxiliary child seat in a motor vehicle and providing an alert in the case of improper installation, comprising:
    a seat occupancy sensor providing a first electrical signal indicating whether the auxiliary child seat is present on a vehicle seat;
    a buckle condition sensor providing a second electrical signal indicating whether the seatbelt buckle is fastened or unfastened;
    a seatbelt tension sensor providing a third electrical signal indicating a tautness of the seatbelt;
    a child seat detection module receiving the first, second and third electrical signals and determining an improper installation condition if the auxiliary child seat is present and the seatbelt buckle is unfastened, and further determining an improper installation condition if the auxiliary child seat is present, the seatbelt buckle is fastened, and the seatbelt tautness is not within an acceptable range; and
    an alerting device operative to alert a vehicle occupant if the child seat detection module determines that the improper installation condition exists.

12. The apparatus of claim 11, wherein the device operative to detect whether or not the auxiliary child seat is properly positioned further comprises an occupant classification system.

13. The apparatus of claim 12, wherein the occupant classification system is a weight sensor.

14. The apparatus of claim 12, wherein the occupant classification system is a pressure pattern sensor.

15. The apparatus of claim 11, wherein the device operative to alert the vehicle occupant comprises a sound generating device.

16. The apparatus of claim 11, wherein the device operative to alert the vehicle occupant comprises a device generating a visual display.

17. The apparatus of claim 11 wherein the child seat detection module stores information related to one or more auxiliary child seats for use with the vehicle.

18. The apparatus of claim 11, further comprising a user interface operative to allow the vehicle occupant to enter information into the child seat detection module, said information usable by the child seat detection module to determine the acceptable range.

* * * * *